(No Model.) 2 Sheets—Sheet 1.
P. J. HARDY.
CUTTER HEAD FOR MOLDING MACHINES.

No. 400,673. Patented Apr. 2, 1889.

(No Model.) 2 Sheets—Sheet 2.
P. J. HARDY.
CUTTER HEAD FOR MOLDING MACHINES.

No. 400,673. Patented Apr. 2, 1889.

Witnesses
Chas. J. Williamson.
Henry C. Hazard.

Inventor
P. J. Hardy, by
Prindle and Russell, his Att'ys

UNITED STATES PATENT OFFICE.

PETER J. HARDY, OF TOM'S RIVER, NEW JERSEY.

CUTTER-HEAD FOR MOLDING-MACHINES.

SPECIFICATION forming part of Letters Patent No. 400,673, dated April 2, 1889.

Application filed April 30, 1887. Renewed January 19, 1889. Serial No. 296,903. (No model.)

*To all whom it may concern:*

Be it known that I, PETER J. HARDY, of Tom's River, in the county of Ocean and in the State of New Jersey, have invented certain new and useful Improvements in Cutter-Heads for Molding-Machines; and I do hereby declare that the following is a full, clear, and exact description thereof, reference being had to the accompanying drawings, in which—

Figure 1:
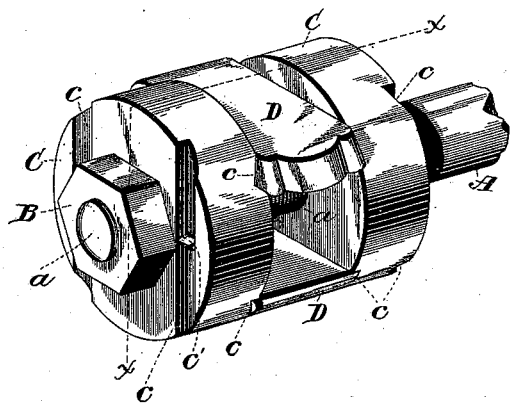
Figure 2:
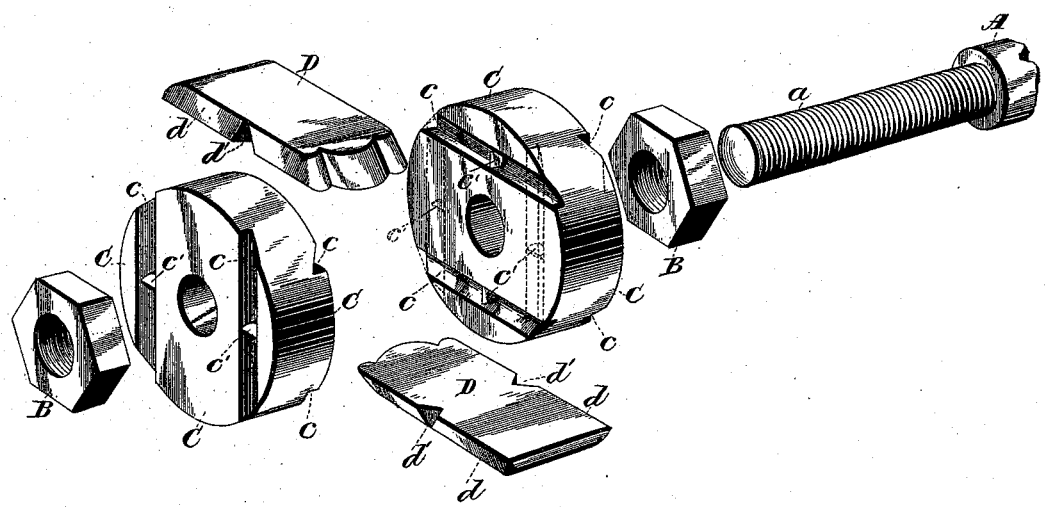
Figure 3:
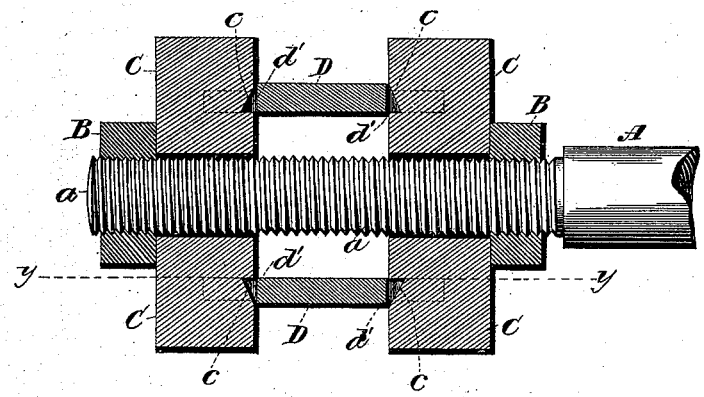
Figure 4:
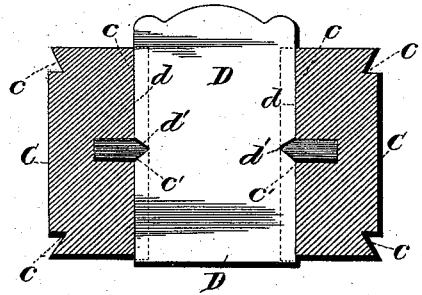

Figure 1 is a perspective view of my device as arranged for use. Fig. 2 is a like view of the parts of the same separated from each other. Fig. 3 is a section upon line $x\,x$ of Fig. 1; and Fig. 4 is a like view upon line $y\,y$ of Fig. 2.

Letters of like name and kind refer to like parts in each of the figures.

The object of my invention is to enable the cutters of a molding-machine to be readily adjusted to different positions, and when thus adjusted to be secured in place; to which end such invention consists, principally, as an improvement in molding-machines, in the combination of a journaled spindle, two disks which are placed upon and adapted to be rotated with and to be relatively moved lengthwise of the same, and are provided within their contiguous faces with transverse grooves that have each a projecting stud, and cutters which have notched side edges that are adapted to enter said grooves and to engage with said studs, substantially as and for the purpose hereinafter specified.

It consists, further, as a means for securing a cutter in position within a cutter-head, in two disks that are adapted to rotate with a journaled spindle in the same plane and around a common axis, and are provided within their contiguous faces with coinciding grooves that are adapted to engage with the side edges of a cutter, and with pins which are arranged in said grooves and adapted to engage with corresponding notches in said cutter-edges, in combination with said spindle, and with means whereby said disks may be moved toward each other, substantially as and for the purpose hereinafter set forth.

It consists, further, as an improvement in cutter-heads, in the combination of two reversible clamping-disks that are provided within each of their faces with grooves for engagement with the side edges of a cutter, each of which grooves may be caused to coincide with one of the grooves of the opposite disk, and is provided with a pin for engagement with a notch in the edge of a cutter that has a position with relation to the longitudinal center of said groove, which is different from the like position of either of the other pins of the same disk, substantially as and for the purpose hereinafter shown and described.

It consists, finally, in the special construction and combination of parts, substantially as and for the purpose hereinafter specified.

In the carrying of my invention into practice I employ a rotatable spindle, A, which has its projecting end provided with a peripheral thread, $a$, that receives two nuts, B and B.

Upon the spindle A, between the nuts B and B, are placed two disks, C C, that have any desired diameter, and are adapted to be rotated upon and moved lengthwise of said shaft. Within each face of each disk is formed two or more transverse grooves, $c$ and $c$, that preferably have a V shape in cross-section, and are each adapted to receive and contain the correspondingly-shaped side edge, $d$, of a cutter, D, the arrangement being such that when the grooves upon the inner faces of said disks are caused to coincide, and a cutter is placed within and extends between each pair, said cutters may be securely clamped in place by turning one of said nuts B, so as to press the contiguous disk toward the opposite disk.

In order that the longitudinal position of each cutter C may be insured, each edge $d$ of each cutter is provided with a notch, $d'$, preferably V-shaped, which engages with a correspondingly-shaped pin, $c'$, that is secured within and projects from the bottom of each groove $c$. By varying the relative positions of said studs within the grooves upon opposite sides of said disks it will be seen that the projection of the cutting ends of said cutters may be correspondingly varied. I preferably provide within each face of each disk grooves for the reception of but one set of cutters; but, if desired, two sets of grooves may be formed within each face, as shown by the full and dotted lines.

In the drawings are shown but two cutters in one head; but it will be obvious that three or even four cutters may be employed, if desired; or that one only need be used, if necessary, in which latter event a dummy or block would be used in place of one cutter.

Having thus described my invention, what I claim is—

1. As an improvement in molding-machines, the combination of a journaled spindle, two disks which are placed upon and adapted to be rotated with and to be relatively moved lengthwise of the same, and are provided within their contiguous faces with transverse grooves that have each a projecting stud, and cutters which have notched side edges that are adapted to enter said grooves and to engage with said studs, substantially as and for the purpose specified.

2. As a means for securing a cutter in position within a cutter-head, two disks that are adapted to rotate with a journaled spindle in the same plane and around a common axis, and are provided within their contiguous faces with coinciding grooves that are adapted to engage with the side edges of a cutter, and with pins which are arranged in said grooves and adapted to engage with corresponding notches in said cutter-edges, in combination with said spindle, and with means whereby said disks may be moved toward each other, substantially as and for the purpose set forth.

3. As an improvement in cutter-heads, the combination of two reversible clamping-disks that are provided within each of their faces with grooves for engagement with the side edges of a cutter, each of which grooves may be caused to coincide with one of the grooves of the opposite disk, and is provided with a pin for engagement with a notch in the edge of a cutter that has a position with relation to the longitudinal center of said groove which is different from the like position of either of the other pins of the same disk, substantially as and for the purpose shown and described.

4. In combination with the threaded spindle provided with the nuts, the disks having within each face two or more grooves, and each groove provided with an engaging-pin, and the cutters which have each side edge adapted to fit into either of said grooves and provided with a notch for engagement with said pin, substantially as and for the purpose specified.

In testimony that I claim the foregoing I have hereunto set my hand this 25th day of April, A. D. 1887.

PETER J. HARDY.

Witnesses:
WILLIAM A. LOW,
HENRY A. LOW.